No. 773,668. PATENTED NOV. 1, 1904.
I. S. McDOUGALL.
HEATING AND VENTILATING BUILDINGS.
APPLICATION FILED DEC. 28, 1901.
NO MODEL. 2 SHEETS—SHEET 1.
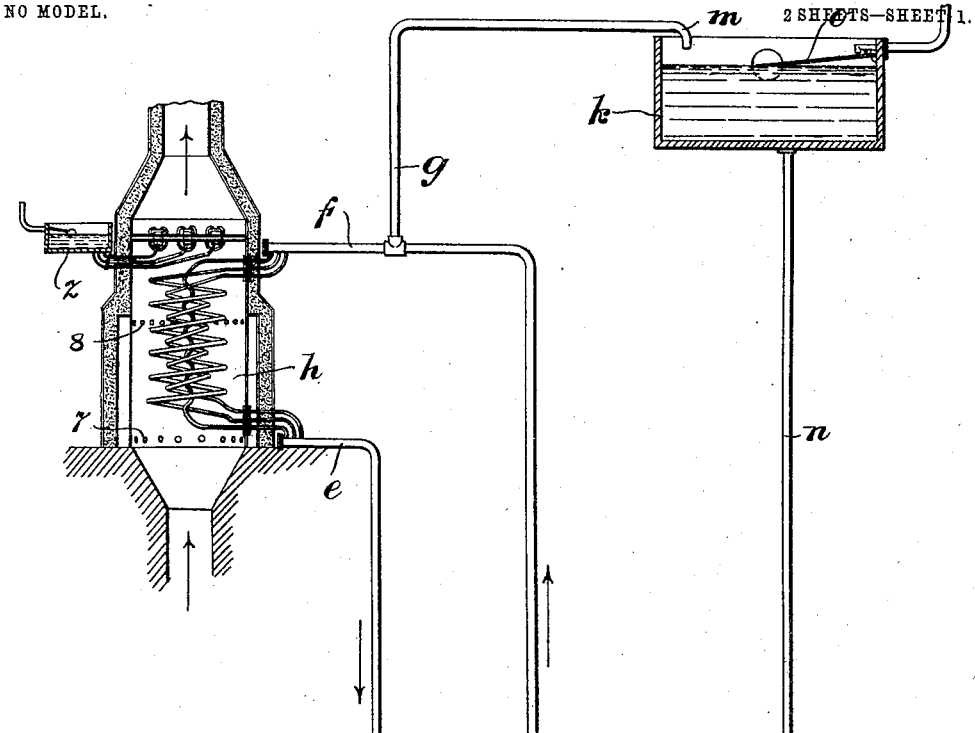
Fig. 1.
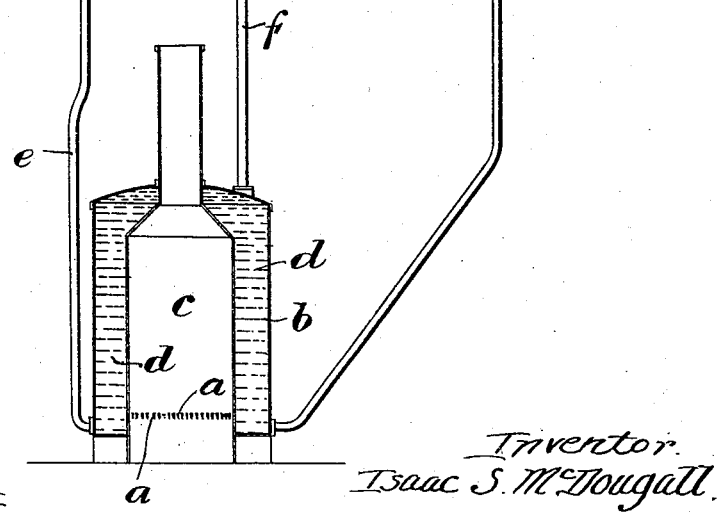
Attest:
C. S. ___
Edward Sarton
Inventor.
Isaac S. McDougall
by Ellis Spear
Atty.

No. 773,668. PATENTED NOV. 1, 1904.
I. S. McDOUGALL.
HEATING AND VENTILATING BUILDINGS.
APPLICATION FILED DEC. 28, 1901.
NO MODEL. 2 SHEETS—SHEET 2.

Attest:
C. S. Middleton
Edward Sarton

Inventor
Isaac. S. McDougall
by Ellis Spear
Atty.

No. 773,668.

Patented November 1, 1904.

UNITED STATES PATENT OFFICE.

ISAAC SHIMWELL McDOUGALL, OF MANCHESTER, ENGLAND.

HEATING AND VENTILATING BUILDINGS.

SPECIFICATION forming part of Letters Patent No. 773,668, dated November 1, 1904.

Application filed December 28, 1901. Serial No. 87,633. (No model.)

*To all whom it may concern:*

Be it known that I, ISAAC SHIMWELL MC-DOUGALL, engineer, a subject of the King of Great Britain and Ireland, residing at 68 Port street, Manchester, in the county of Lancaster, England, have invented certain new and useful Improvements Relating to the Heating and Ventilating of Buildings, (for which I have made application for Letters Patent in Great Britain, No. 13,152, of June 27, 1901,) of which the following is a specification.

This invention relates to the heating and ventilating of buildings; and its object is to heat and moisten the air and cause it to circulate through the rooms or other parts of the building to be heated and ventilated and at the same time to dispense with the use of fans, pumps, mechanical moisteners, and other moving mechanism.

My invention consists in an apparatus for heating and moistening air, which apparatus will be fully described in the specification and its novel features pointed out in the claim.

Figure 2:
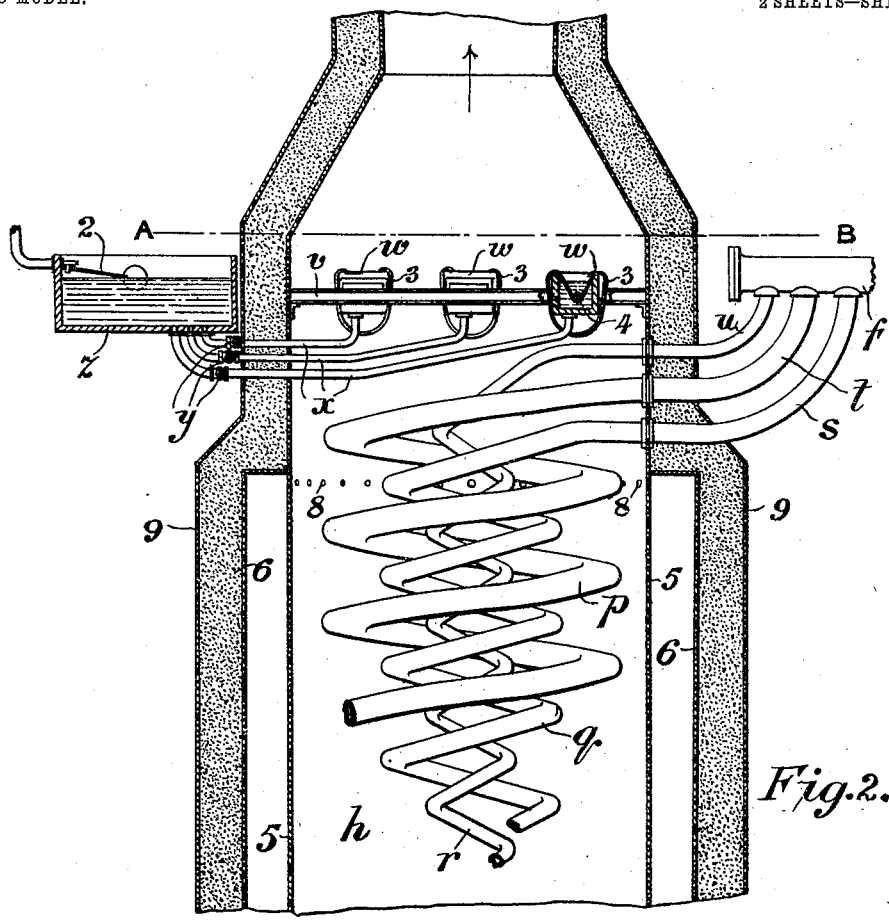
Figure 3:
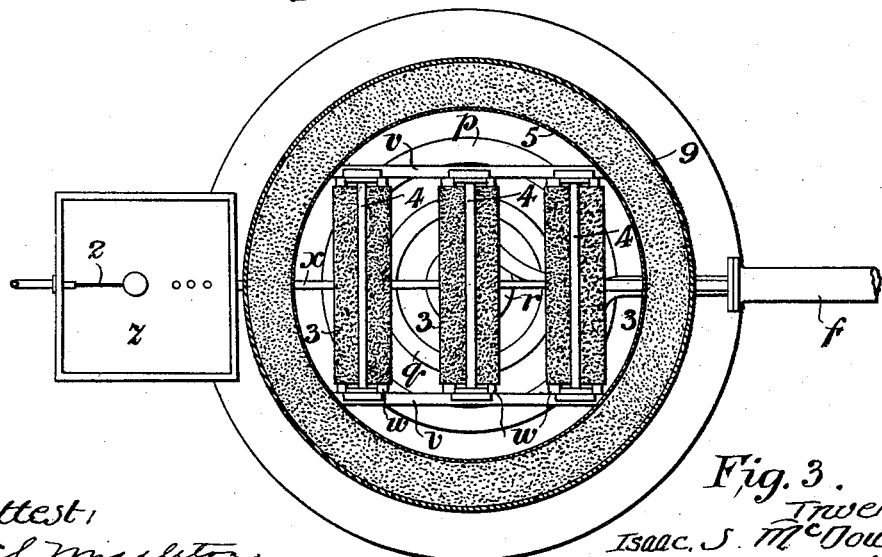

Referring to the accompanying drawings, which illustrate my invention, Figure 1 shows one form and arrangement of apparatus. Fig. 2 is a section of the air-heating chamber shown in Fig. 1, but drawn to an enlarged scale. Fig. 3 is a horizontal section on the line A B of Fig. 2.

Referring now to Fig. 1, $b$ is a water-heater of which $a$ $a$ are the fire-bars, $c$ the combustion-chamber, and $d$ the water-space. This water-heater should be situated in the basement or other convenient place in the building to be heated and ventilated. A tube $e$ is connected to the bottom of the water-space and a tube $f$ to the top of the water-space. The tubes are led to the outside of the air-heating chamber $h$. This chamber contains coils, the lower ends of which are connected to the pipe $e$ and the upper ends to the pipe $f$. From the pipe $f$ extends a pipe $g$, which is led to a convenient part of the building where is situated a tank or cistern $k$. The end $m$ of this pipe $g$ is led over this tank so that any water which is forced out of this pipe $g$ will fall into the tank. The pipe $g$ acts as a safety-valve and allows of the escape of water should the pressure from any cause exceed the amount desired, which pressure is that due to the head of water from the highest point of the pipe $g$ to the water-heater. The pipe $g$, which should be connected to the highest point of the pipe $f$, also serves for the escape of any steam or air or other gas which may get into the pipe $f$. This tank $k$ contains water and is preferably provided with a float-valve $o$ or other automatic valve which maintains the water-level at a constant height. The tank is connected by the pipe $n$ with the water-space of the water-heater $b$. The coils in the air-heating chamber (which are best seen in Figs. 2 and 3) are arranged in three spirals or helices $p$, $q$, and $r$. The upper ends of these helices of pipe are connected, by means of the coupling-pipes $s$ $t$ $u$, with the pipe $f$, leading from the water-heater. The lower ends of the coils are similarly connected to the other pipe, $e$, leading to the water-heater. The outer coil $p$ is made of larger section than the intermediate coil $q$, and this again is made of larger section than the inner coil $r$. The reason for making the coils of different section is to allow the water in all of them to be equally cooled in its passage through them. The water rises up from the water-heater by the pipe $f$, passes downward through all the coils in parallel, and returns to the water-heater by the pipe $e$. The air enters the heating-chamber at the bottom and passes round and through between the coils, leaving the chamber at the top. If the coils had been of equal section and of equal pitch, the outer one, owing to its greater length, would have had more cooling-surface for the water it contained or greater heating-surface for the air which impinged on its exterior. By making the coils of different section I obtain an equal amount of superficial area in each for each cubic foot of water passing through it, while constructing the coils of equal or nearly equal pitch of convolutions. By this means each coil can do an equal amount of work in heating the air, and the length of the whole arrangement of coils is designed to give the fall of temperature which is found to be best. As I employ no steam in the heating-coils, but only hot water, and as this water is only at a low pressure, it will be evident that this device for insuring that the water shall fall in temperature the same amount in passing through all the coils is most important and most valuable, for if one coil gets cooled too much its lower end will not be effective in heating the air, while if it does not get cooled enough a greater amount of heat than is necessary is returned to the water-heater. At the upper end of the air-heating chamber I provide tanks $w$, which are supported on beams $v$, extending across the top of the air-heating chamber. The tanks are connected by pipes $x$, provided with cocks $y$, with a cistern $z$, containing water. A float-valve 2 or other automatic valve is provided for the purpose of maintaining constant the water-level in the cistern. When the cocks $y$ are open, as they are normally, the water will stand at the same height in the tanks $w$ as in the cistern $z$. Pieces of fibrous material 3 are allowed to dip into the tanks and then to pass over their sides and to hang down around the tanks. Water saturates the fibrous material by capillary action, and thus a large amount of wet surface is exposed to the hot air as it leaves the air-heating chamber. The heated air is in a condition to take up moisture and obtains this from the wet surface of the fibrous material. The material is preferably formed in endless bands, the width of each band being that of the length of the tank which it envelops. The material passes below bars 4, which extend the length of the tanks and below the level of the water in them. These bars can be arranged to pass below snugs or catches in the ends of the tanks, so that they can be withdrawn when desired. The tanks preferably only rest on the beams $v$ and are not fastened down to them, so that any tank can be lifted away when desired. The air in the air-heating chamber and the duct or ducts above it will be lighter than the air outside, and a current will therefore be induced through the air-heating chamber in a manner that is well understood. The arrangement of coils in the chamber is such as to impede the passage of the air very little. As the air does not require to pass through the saturated fibrous material, but only pass round it, practically no resistance is offered to the passage of the air. It will be evident on disconnecting the coils from the union-pieces $s\ t\ u$ at the top and the corresponding union-pieces at the bottom that the coils may be withdrawn through any door (not shown) in the air-heating chamber. The coils may be removed together or one by one. The heating-chamber is preferably formed of sheet-iron or other sheet metal, formed into a cylinder 5, and around this cylinder 5 is an outer concentric cylinder 6. The annular space between these two cylinders forms an air-jacket. Air can enter and leave this jacket by small holes 7 and 8 at the bottom and top of the jacket, respectively; but these holes are made so small that there is very little circulation of air in the jacket. There is only sufficient circulation to prevent the air from getting overheated. This air-jacket absorbs the heat radiated from the cylinder 5. The outer cylinder 6 and the conical top and bottom ends of the air-heating chamber may be lagged with slag, wool, asbestos, or other suitable material 9, which is a bad conductor of heat. An outer casing preferably surrounds the non-conducting material 9.

I may employ one water-heater to supply hot water to several air-heating chambers, the air-heating chambers being in the same part or in different parts of the building.

Having now described my invention, what I claim as new, and desire to secure by Letters Patent, is—

In apparatus for heating and ventilating buildings, in combination, a cylindrical air-heating chamber, coils of pipe arranged in concentric vertical helices in and coaxial with the said chamber, the pitch of convolutions of all the coils being equal and the sections of the coils being so proportioned to their lengths as to make the superficial area of each coil proportional to its capacity, a water-heater, pipes connecting the upper end of the water-space in the said water-heater with the upper ends of the said coils, and the lower end of the said water-space with the lower ends of the said coils, means for moistening the air in said air-heating chamber, a tank adapted to supply water to said water-heater and a pipe with an open end extending upward from the pipe connecting the upper end of the water-space in the water-heater to the upper ends of the said coils, substantially as described.

In witness whereof I have hereunto set my hand in presence of two witnesses.

ISAAC SHIMWELL McDOUGALL.

Witnesses:
 ROBERT MORRISON NEILSON,
 VIVIAN ARTHUR HUGHES.